(12) United States Patent
Pessin et al.

(10) Patent No.: US 8,020,294 B2
(45) Date of Patent: Sep. 20, 2011

(54) METHOD OF CONSTRUCTING AN EXPANDABLE PACKER

(75) Inventors: Jean-Louis Pessin, Houston, TX (US); Pierre-Yves Corre, Eu (FR); Guillaume Boutillon, Abbeville (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 242 days.

(21) Appl. No.: 12/203,376

(22) Filed: Sep. 3, 2008

(65) Prior Publication Data

US 2010/0051259 A1    Mar. 4, 2010

(51) Int. Cl.
*B21D 39/00* (2006.01)
*B21D 53/00* (2006.01)

(52) U.S. Cl. ............ 29/888.3; 29/527.1; 29/527.2; 166/180

(58) Field of Classification Search ............ 29/888.3, 29/527.1, 527.2, 428; 166/180, 187, 196
See application file for complete search history.

(56) References Cited

U.S. PATENT DOCUMENTS

| | | | | |
|---|---|---|---|---|
| 2,830,540 A * | 4/1958 | Vincent | ............. | 417/59 |
| 2,942,667 A * | 6/1960 | Bridwell et al. | ............. | 277/333 |
| 4,862,967 A * | 9/1989 | Harris | ............. | 166/387 |
| 6,581,682 B1 * | 6/2003 | Parent et al. | ............. | 166/180 |
| 7,357,189 B2 * | 4/2008 | Aldaz et al. | ............. | 166/380 |
| 7,363,970 B2 * | 4/2008 | Corre et al. | ............. | 166/187 |
| 7,392,851 B2 | 7/2008 | Brennan, III et al. | | |
| 7,431,098 B2 | 10/2008 | Ohmer et al. | | |
| 7,458,252 B2 | 12/2008 | Freemark et al. | | |
| 7,458,419 B2 | 12/2008 | Nold, III et al. | | |
| 7,458,420 B2 | 12/2008 | Rioufol et al. | | |
| 7,461,695 B2 | 12/2008 | Boney et al. | | |
| 2005/0217869 A1 * | 10/2005 | Doane et al. | ............. | 166/387 |
| 2007/0114017 A1 * | 5/2007 | Brezinski et al. | ............. | 166/179 |

\* cited by examiner

*Primary Examiner* — Jermie E Cozart
(74) *Attorney, Agent, or Firm* — David J Smith

(57) ABSTRACT

A technique involves a packer formed as an expandable packer with an internal expandable bladder. The expandable bladder is formed with a section that is radially enlarged relative to an axial end of the expandable bladder when the bladder is in a relaxed state. The bladder configuration enables use of a reduced expansion ratio while still allowing expansion of the packer to a desired large diameter.

16 Claims, 4 Drawing Sheets

METHOD OF CONSTRUCTING AN EXPANDABLE PACKER

BACKGROUND

A variety of packers are used in wellbores to isolate specific wellbore regions. A packer is delivered downhole on a tubing string and a packer sealing element is expanded against the surrounding wellbore wall to isolate a region of the wellbore. Often, two or more packers can be used to isolate several regions in a variety of well related applications, including production applications, service applications and testing applications.

Some packers are constructed as inflatable packers that can be selectively inflated to form a seal in a wellbore. Inflatable packers generally are constructed on cylindrical mandrels by forming an inflatable bladder over a corresponding cylindrical mandrel to create a cylindrical bladder. The bladder is connected to metallic extremities and can be surrounded by additional layers. Inflation of the bladder causes expansion of the inflatable packer. However, the cylindrical, inflatable bladder either has a limited expansion ratio or requires use of materials that enable a greater expansion ratio. Materials that allow the greater expansion ratio can be susceptible to high temperatures, aggressive downhole fluids, and other factors that detrimentally affect the function and longevity of the packer.

SUMMARY

In general, the present invention provides a system and method for constructing an expandable packer, such as an inflatable packer. The expandable packer is formed with an expandable bladder having a section that is radially enlarged relative to an axial end of the expandable bladder when the bladder is in a relaxed state. The bladder configuration enables use of a reduced expansion ratio while still allowing expansion of the packer to a desired large diameter.

BRIEF DESCRIPTION OF THE DRAWINGS

Certain embodiments of the invention will hereafter be described with reference to the accompanying drawings, wherein like reference numerals denote like elements, and.

DETAILED DESCRIPTION

In the following description, numerous details are set forth to provide an understanding of the present invention. However, it will be understood by those of ordinary skill in the art that the present invention may be practiced without these details and that numerous variations or modifications from the described embodiments may be possible.

The present invention generally relates to a system and method involving the creation of packers used to form seals within a wellbore. For example, many types of well production and treatment applications include isolating a specific region or regions along a wellbore. The isolated regions can be created by expanding one or more packers within the wellbore to separate regions along the wellbore with respect to each other.

In one embodiment, an expandable packer is formed with an expandable bladder that is created in a partially expanded configuration. In other words, the expandable bladder comprises a section of the bladder that extends in a radially outward direction when the expandable bladder is in a relaxed state. The system and methodology enable construction of a packer with a lower expansion ratio while still enabling expansion of the packer to the full diameters needed to form desired seals within the wellbore. The ability to construct a packer with lower expansion ratios ensures better packer performance, reduces the potential for wear and damage, and may allow the use of a greater variety of bladder materials and other packer component materials. The packer can be manufactured with a relatively large inner bladder diameter relative to the axial ends/extremities of the packer. The large diameter reduces bladder material elongation when the packer is expanded, e.g. inflated, thus reducing limitations otherwise caused by the diameter of the axial ends/extremities of the packer.

Figure 1:
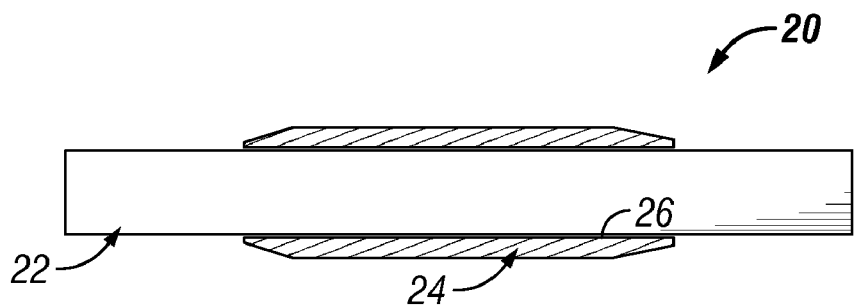
FIG. 1 is a front elevation view of a manufacturing mandrel and a radially expanded section, according to an embodiment of the present invention.

Referring generally to FIG. 1, one example of a multi-diameter mandrel 20 is illustrated. In this embodiment, multi-diameter mandrel 20 comprises a manufacturing mandrel 22 and a radially expanded section 24 disposed over the manufacturing mandrel 22. By way of example, the manufacturing mandrel 22 may be generally cylindrical in shape, and the radially expanded section 24 may have an internal passage 26 with a diameter selected to slidably receive the manufacturing mandrel 22. With the radially expanded section 24 positioned over manufacturing mandrel 22, the central diameter of multi-diameter mandrel 20 is larger than the diameters at its axial extremities.

Figure 2:
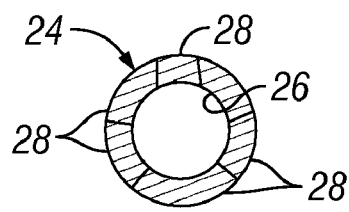
FIG. 2 is an end view of one example of the radially expanded section, according to an embodiment of the present invention.
Figure 3:
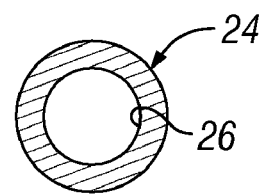
FIG. 3 is an end view of another example of the radially expanded section, according to an alternate embodiment of the present invention.

In FIGS. 2 and 3, examples are provided of radially expanded sections 24 that can be used to facilitate the construction of an expandable, e.g. inflatable, packer. In the example of FIG. 2, radially expanded section 24 is formed by combining rigid, solid segments or pieces 28 that can be separated and removed individually after construction of an expandable packer. By way of example, the segments 28 can be formed from metal materials, hard plastic materials, or other suitable materials. In an alternate embodiment illustrated in FIG. 3, radially expanded section 24 is constructed from a flexible material which can be flexed in a manner that facilitates removal after construction of the expandable packer. By way of example, the flexible, radially expanded section 24 may be formed from an elastomeric material that is resilient and allows flexing and bending.

Figure 4:
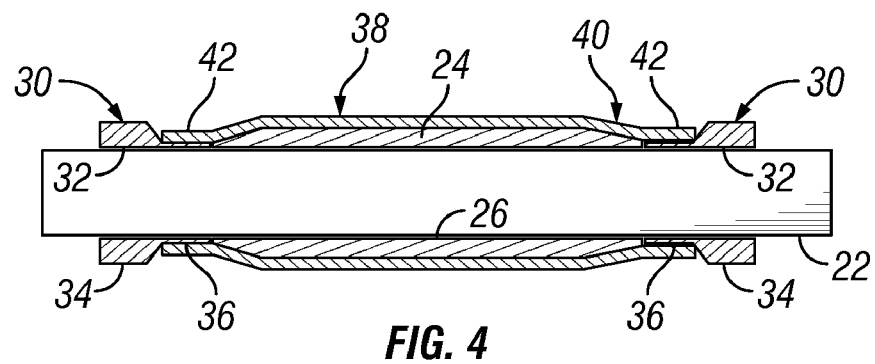
FIG. 4 is a front elevation view of an expandable bladder being formed over the manufacturing mandrel and the radially expanded section, according to an embodiment of the present invention.
Figure 5:
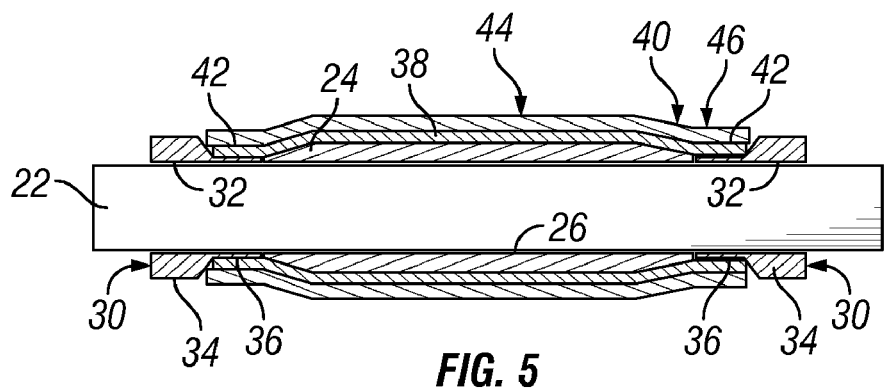
FIG. 5 is an illustration similar to that of FIG. 4 but including a mechanical structure mounted around the expandable bladder, according to an embodiment of the present invention.

Referring generally to FIG. 4, an example is provided of the initial stages of packer formation. In this example, a pair of packer extremities 30 is slid over the manufacturing mandrel 22 into proximity with radially expanded section 24. Each packer extremity 30 has a central passage 32 sized generally according to the diameter of manufacturing mandrel 22. Furthermore, each packer extremity 30 may comprise an axially outer thick section 34 and an axially inward thin section 36. The packer extremities 30 can be formed from a metal material. As illustrated, an expandable bladder 38 is formed over manufacturing mandrel 22 and radially expanded section 24 to create an expandable bladder 38 having a radially enlarged section 40 formed as a result of radially expanded section 24 of multi-diameter mandrel 20. The expandable bladder 38 may be generally tubular in shape with changing diameters along the tubular shape.

In the example illustrated, radially enlarged section 40 comprises a midsection bounded by bladder ends 42 that have a reduced diameter relative to radially enlarged section 40. Bladder ends 42 are designed to engage packer extremities 30 by, for example, being formed over the thin sections 36 of packer extremities 30. Depending on the material used to form expandable bladder 38, the formation process can vary. By way of example, expandable bladder 38 may be molded over manufacturing mandrel 22, radially expanded section 24, and thin sections 36; however other formation techniques can be used to create the expandable bladder 38, such as injection molding, compression molding and/or curing among other techniques. In some embodiments, materials used to form expandable bladder 38 include elastomeric materials, such as a variety of synthetic rubber materials and other rubber materials or mixtures of materials. In other embodiments, materials used to form expandable bladder 38 include an oil resistant rubber, such as NBR (Nitrile Butadiene Rubber), HNBR (Hydrogenated Nitrile Butadiene Rubber) and/or FKM (Fluoroelastomers). In a specific high performance desired application, the expandable bladder 38 is constructed of a high acrylonytrile HNBR rubber, such as an HNBR rubber having a percentage of acrylonytrile in the range of approximately 21 to approximately 49%. The use of manufacturing mandrel 22 and radially expanded section 24 enables creation of a radially enlarged section, e.g. section 40, that remains in its radially enlarged configuration when the bladder is in a relaxed, non-stressed state. As a result, when the packer 46 is inflated to a given diameter, the expansion ratio of inner, expandable bladder 38 is significantly reduced. The reduced expansion ratio can significantly enhance the performance of packer 46 by enabling selection of bladder materials more resistant to high temperatures, aggressive fluids, or other subterranean, well-related factors.

After forming expandable bladder 38 over manufacturing mandrel 22 and radially expanded section 24, a mechanical structure 44 may be mounted around the expandable bladder 38 to create an expandable packer 46. Depending on the desired applications for expandable packer 46 and the environments in which packer 46 is to be utilized, the configuration and materials of mechanical structure 44 can vary. For example, mechanical structure 44 may comprise individual or multiple layers. In some applications, mechanical structure 44 may comprise cables, slats, or other structures designed to enhance packer longevity and the formation of seals at desired wellbore locations. Additional layers also can be incorporated within mechanical structure 44 or along the exterior of mechanical structure 44. For example, mechanical structure 44 may include or be combined with an outer layer of seal material, such as a rubber material and may extend between each of the bladder ends 42 along substantially the entire longitudinal length of an exterior surface of the expandable bladder 38, as seen in FIGS. 5-8.

Figure 6:
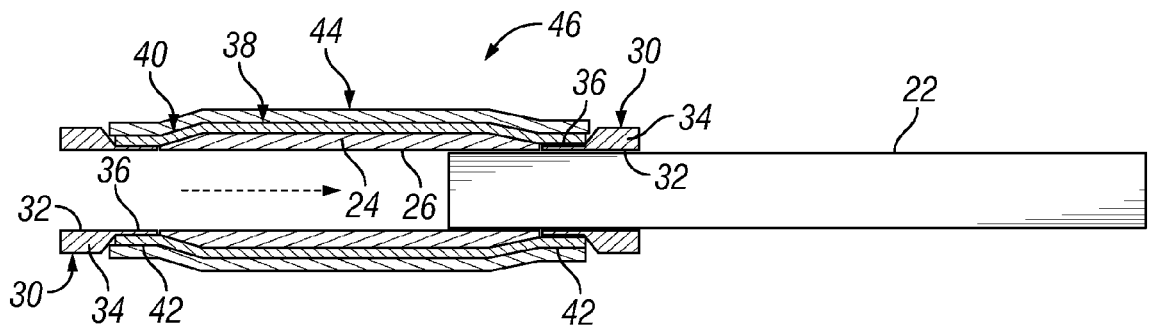
FIG. 6 is an illustration similar to that of FIG. 5 but showing the manufacturing mandrel being withdrawn, according to an embodiment of the present invention.
Figure 7:
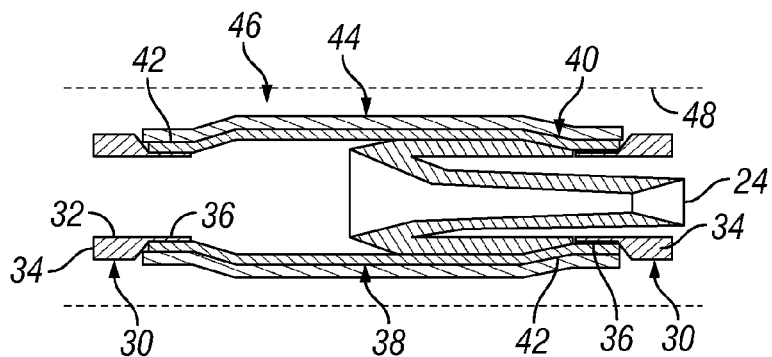
FIG. 7 is an illustration similar to that of FIG. 5 but showing the radially expanded section being withdrawn, according to an embodiment of the present invention.

After constructing packer 46 over manufacturing mandrel 22 and radially expanded section 24, manufacturing mandrel 22 can be removed, as illustrated in FIG. 6. As illustrated, manufacturing mandrel 22 is slid out of radially expanded section 24 along internal passage 26 and passages 32 of packer extremities 30 until the manufacturing mandrel is completely removed. Once the manufacturing mandrel 22 is removed, the radially expanded section 24 also is removed. If the radially expanded section 24 is formed from flexible, elastomeric material, the flexible material can be folded with an appropriate tool and removed through one of the packer extremities 30, as illustrated in FIG. 7. It should be noted that once radially expanded section 24 is removed, the packer 46 is ready for placement into a wellbore and for expansion into sealing engagement with a surrounding wall located in the wellbore. In FIG. 7, a wellbore wall 48 is illustrated schematically with dashed lines. Expansion of the packer 46 can be accomplished by inflating the packer with fluid introduced into the packer interior through passages in one of the packer extremities or through other suitable passages as with conventional inflatable packers.

Figure 8:
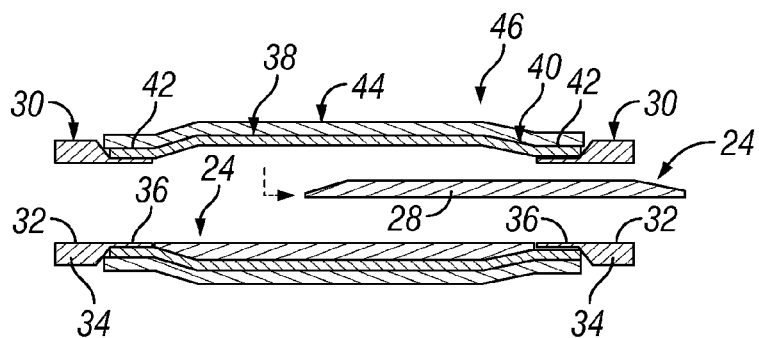
FIG. 8 is an illustration similar to that of FIG. 5 but showing another embodiment of the radially expanded section being withdrawn, according to an alternate embodiment of the present invention.
Figure 9:
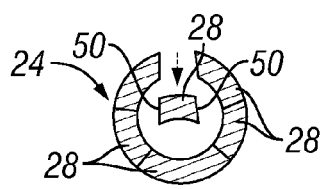
FIG. 9 is an end in view of the partially disassembled, radially expanded section illustrated in FIG. 8, according to an embodiment of the present invention.

If radially expanded section 24 is formed with rigid, solid segments 28, the individual pieces of the radially expanded section 24 can be separated, as illustrated in FIG. 8. The individual segments are then removed through passage 32 of one of the packer extremities 30. By way of example, one of the segments 28 can be formed with appropriately sloped side surfaces 50 that enable the manufacturing mandrel 22 to support the segments 28 in a generally cylindrical shape when mounted over the manufacturing mandrel 22. However, the angle of side surfaces 50 also allows the segment to move radially inwardly, as illustrated in FIG. 9, after the manufacturing mandrel 22 is removed. Once the initial segment is pulled through packer extremity 30, the subsequent segments 28 also can be disassembled and removed through the packer extremity 30.

Figure 10:
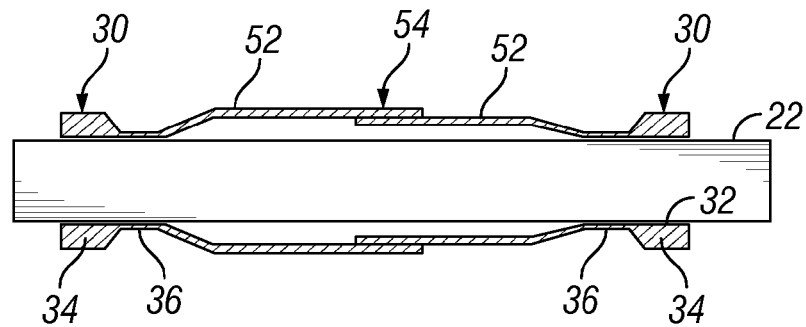
FIG. 10 is a front elevation view of a manufacturing mandrel with an inner packer structure mounted over the manufacturing mandrel, according to an alternate embodiment of the present invention.

Referring generally to FIG. 10, an alternate approach to constructing expandable packer 46 is illustrated. In this embodiment, packer extremities 30 are slid over manufacturing mandrel 22. However, instead of using a radially expanded section on the manufacturing mandrel, the packer extremities 30 are each coupled to or integrally formed with a radially flared extension 52. The flared extensions 52 are sized to create an overlapping region 54 when packer extremities 30 are slid a sufficient distance along manufacturing mandrel 22, as illustrated in FIG. 10.

Figure 11:
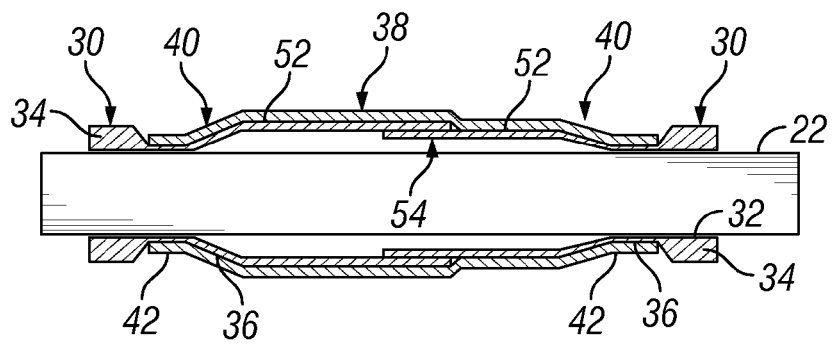
FIG. 11 is an illustration similar to that of FIG. 10 but showing an expandable bladder mounted over the inner packer structure, according to an embodiment of the present invention.

Once the flared extensions 52 are moved into the overlapping configuration, the expandable bladder is formed over the flared extensions 52 to create the expandable bladder 38 with radially enlarged section 40, as illustrated in FIG. 11. The radially enlarged section 40 is created as a result of the radially outward extension of flared extensions 52. In one embodiment, the flared extensions 52 are axially moveable relative to each other, allowing the bladder 38 to expand and contract during inflation and deflation of the bladder 38.

In the example illustrated, radially enlarged section 40 again comprises a midsection bounded by bladder ends 42 that have a reduced diameter relative to radially enlarged section 40. However, the radially enlarged section 40 could be positioned at other locations along the bladder 38, such as closer to or at one of the bladder ends. Bladder ends 42 are designed to engage packer extremities 30 by, for example, being formed over the thin sections 36 of packer extremities 30. The thin sections 36 can be positioned and constructed to serve as a link or connection between flared sections 52 and the corresponding thick sections 34 of packer extremities 30. As described above, a variety of expandable materials, for example elastomeric materials, such as rubber materials, synthetic rubbers and/or oil resistant rubbers, can be used to construct expandable bladder 38.

Figure 12:
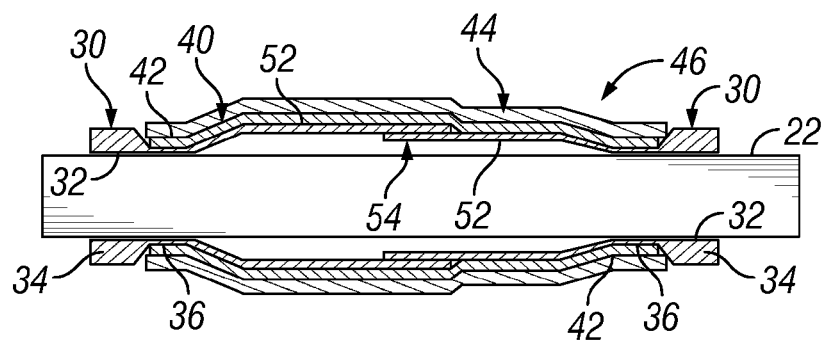
FIG. 12 is an illustration similar to that of FIG. 11 but with a mechanical structure mounted around the expandable bladder, according to an embodiment of the present invention.
Figure 13:
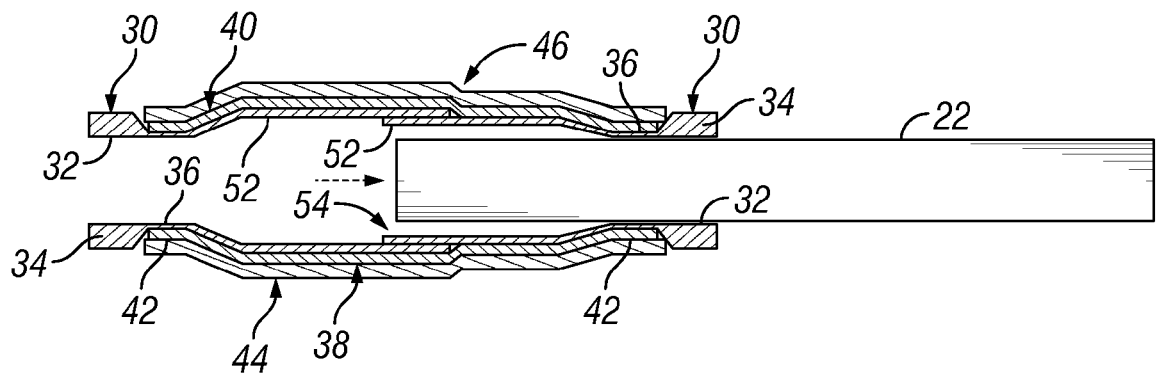
FIG. 13 is an illustration similar to that of FIG. 12 but showing the manufacturing mandrel being withdrawn, according to an embodiment of the present invention.

After forming expandable bladder 38 over manufacturing mandrel 22 and radially flared sections 52, the mechanical structure 44 is mounted around the expandable bladder 38 to create expandable packer 46, as illustrated in FIG. 12. The manufacturing mandrel 22 can then be removed, as illustrated in FIG. 13. The manufacturing mandrel 22 is pulled or pushed through passages 32 of packer extremities 30 until the manufacturing mandrel is completely removed from one axial end of the packer 46.

Figure 14:
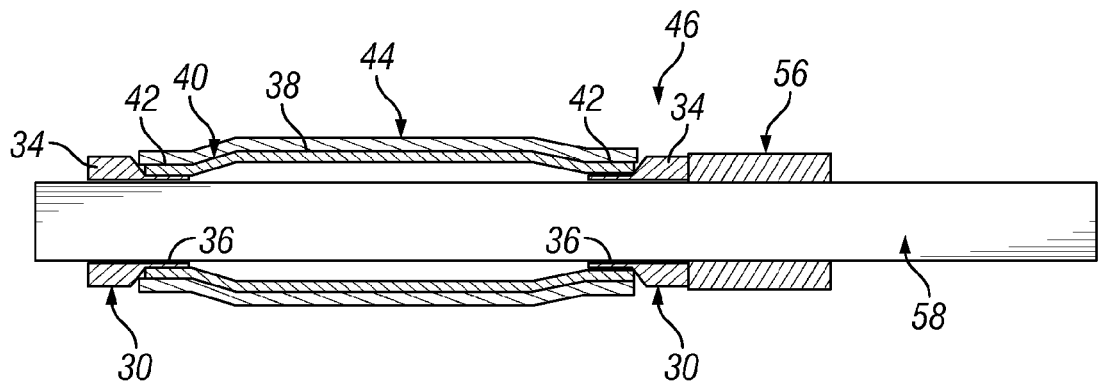
FIG. 14 is a front elevation view of a well tool with a packer structure mounted over the well tool, according to an alternate embodiment of the present invention.
Figure 15:
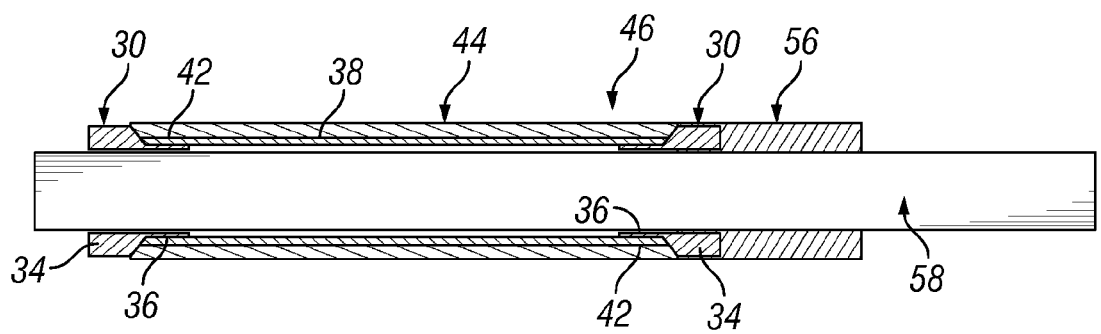
FIG. 15 is an illustration similar to that of FIG. 14 but showing the expandable bladder linearly extended to reduce the packer diameter, according to an embodiment of the present invention.

Referring generally to FIG. 14, another embodiment of expandable packer 46 is illustrated. In this embodiment, packer 46 further comprises an auto retract mechanism 56 used to apply an axial force along the packer. For example, auto retract mechanism 56 can be connected to the expandable bladder 38 through one or both packer extremities 30. In the example illustrated in FIG. 14, the auto retract mechanism 56 is mounted over a well tool 58 and connected to an axial end of the expandable bladder 38 through one of the packer extremities 30. The opposite packer extremity 30 is affixed to well tool 58. The auto retract mechanism 56 can be actuated or biased to apply an axially directed force to the packer 46 which forces the packer to deflate. Additionally, the auto retract mechanism 56 can be used to pull and elongate the expandable bladder 38 and packer 46 to a force induced reduction in diameter, as illustrated in FIG. 15. This enables the relaxed-state diameter of the packer 46 to be selectively decreased which not only further deflates the packer but also facilitates movement of the packer downhole or through restrictions.

By way of example, the auto retract mechanism 56 may comprise a piston actuator or a spring connected to packer extremity 30 and oriented to bias (or to enable actuation of) the expandable bladder 38 to its full lineal length, as illustrated in FIG. 15. Because the expandable bladder 38 and packer 46 are naturally in a semi-expanded state, the auto retract mechanism 56 can be designed so the overall packer 46, including mechanism 56, is not any longer than a conventional packer.

In some applications, the auto retract mechanism system can be designed so its external diameter allows it to fit within the inner diameter of the expandable bladder 38 after manufacturing. In this design, the auto retract mechanism is set during manufacturing and the overall packer assembly is simplified. When the packer 46 is forced to deflate by using the auto retract mechanism 56 to pull the packer in an axial direction, the expandable bladder is not deflated below its manufacturing diameter. In some embodiments, an anti-extrusion member can be positioned to cooperate with the auto retract mechanism 56 to prevent damage during packer deflation if the inner pressure within the packer is lowered below hydrostatic pressure.

Figure 16:
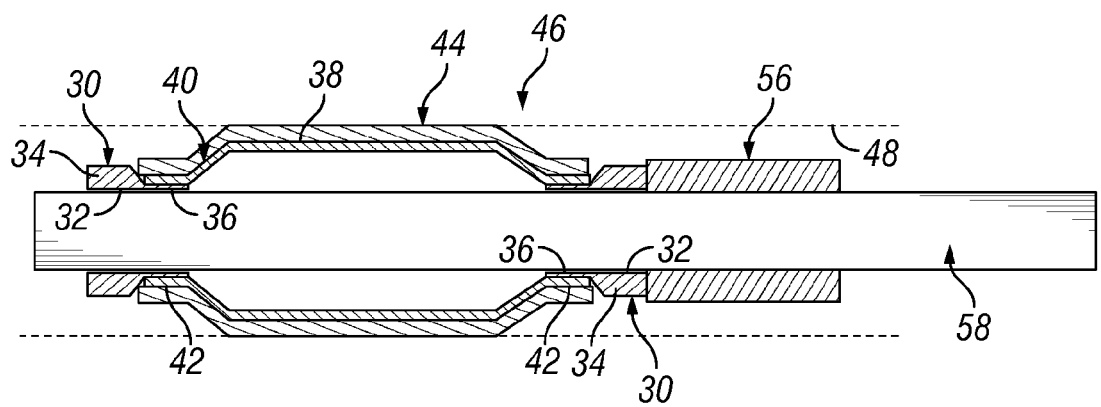
FIG. 16 is an illustration similar to that of FIG. 14 but showing the expandable packer in an expanded configuration, according to an embodiment of the present invention.

Regardless of whether the auto retract mechanism 56 is incorporated into the packer design, the expandable bladder 38 and overall packer 46 can be selectively expanded, e.g. inflated, into sealing engagement with a surrounding surface, such as wellbore wall surface 48, as illustrated in FIG. 16. The radially enlarged section 40 enables transition of the packer 46 into this sealing configuration with a reduced expansion ratio. In some applications, an embodiment of auto retract mechanism 56 is coupled to one of the packer extremities 30 to facilitate deflation of the packer and/or to transition the packer to a smaller diameter than the diameter of packer 46 when in a relaxed state.

In operation, the packer 46 can be mounted on the well tool 58, e.g. a tool string, for movement downhole to a desired well location before being set against a wellbore surface 48. The packer 46 can be mounted to well tool 58 by fixing one of the packer extremities 30, e.g. the upper extremity, with respect to the well tool which prevents the fixed packer extremity from moving during translation of the packer. The bottom packer extremity 30 is able to slide along the well tool 58 to allow axial shortening of the packer when the packer 46 is radially expanded. In some applications, auto retract mechanism 56 can be added to the packer and connected, for example, to the bottom extremity 30 of the packer 46 to enable forced deflation of the packer by applying a pulling force. If the auto retract mechanism is utilized, the stroke of the mechanism is selected to enable full inflation of packer 46.

Expandable packer 46 can be constructed in a variety of configurations for use in many environments and applications. For example, the packer 46 can be constructed in different diameters and lengths with many types of expandable bladders, mechanical structures, and other layers able to facilitate actuation of the packer and sealing of the packer at a desired wellbore location. Furthermore, the radially enlarged section 40 of expandable bladder 38 can be formed with different ratios relative to the diameter of one or more bladder ends 42. In some applications, the radially enlarged section 40 can be selected so the overall diameter of the packer at the radially enlarged section is relatively close to the diameter of the packer when fully inflated. Accordingly, the expansion ratio of the expandable bladder 38 can be reduced to various selected ratios depending on the desired packer applications and on the materials used in constructing bladder 38. By way of example, the radially enlarged section 40 can be selected so the material of expandable bladder 38 experiences half, or less than half, the expansion ratio otherwise required if radially enlarged section 40 is not incorporated into bladder 38. The various packer components and layers also can be constructed from a variety of materials and combinations of materials suitable for a given downhole application.

Accordingly, although only a few embodiments of the present invention have been described in detail above, those of ordinary skill in the art will readily appreciate that many modifications are possible without materially departing from the teachings of this invention. Such modifications are intended to be included within the scope of this invention as defined in the claims.

What is claimed is:

1. A method of constructing a packer, comprising:
mounting a radially expanded section over a manufacturing mandrel;
forming an expandable bladder over the radially expanded section to create a radially enlarged midsection of the expandable bladder between a pair of bladder ends having a diameter smaller than the radially enlarged midsection; and
removing the manufacturing mandrel and the radially expanded section from the expandable bladder after the forming.

2. The method as recited in claim 1, further comprising constructing the expandable bladder from an oil resistant rubber material.

3. The method as recited in claim 1, further comprising mounting a mechanical structure around the expandable bladder.

4. The method as recited in claim 1, further comprising connecting the pair of bladder ends to corresponding metal packer extremities prior to removing the manufacturing mandrel and the radially expanded section.

5. The method as recited in claim 4, wherein removing comprises removing the radially expanded section after removing the manufacturing mandrel.

6. The method as recited in claim 1, wherein removing comprises sliding the manufacturing mandrel out of the expandable bladder.

7. The method as recited in claim 1, wherein mounting comprises mounting an elastomeric, radially expanded section over the manufacturing mandrel.

8. A method of constructing a packer, comprising:
forming an expandable bladder with a radially enlarged midsection disposed between a pair of bladder ends having diameters smaller than a diameter of the radially enlarged midsection when in a relaxed state;
mounting a mechanical structure around the expandable bladder, the mechanical structure extending along an exterior surface of the expandable bladder between each of the bladder ends; and
connecting the pair of bladder ends to corresponding packer extremities to create an expandable packer, wherein forming comprises forming the expandable bladder over a manufacturing mandrel and a radially expanded section positioned to form the radially enlarged midsection.

9. A method, comprising:
mounting a radially expanded section on a manufacturing mandrel;
forming an expandable bladder in a semi-expanded configuration such that a section of the expandable bladder is radially expanded relative to a remaining portion when the expandable bladder is in a relaxed state; and
surrounding substantially the entire longitudinal length of exterior surface of the expandable bladder with a mechanical layer to create an expandable packer.

10. The method as recited in claim 9, further comprising physically extending the expandable packer to reduce a diameter of the section of the expandable bladder.

11. The method as recited in claim 10, further comprising expanding the expandable packer to form a seal at a desired location in a wellbore.

12. The method as recited in claim 9, wherein forming comprises forming the section between a pair of bladder ends having diameters less than a diameter of the section.

13. The method as recited in claim 9, further comprising constructing the expandable bladder from an oil resistant rubber material.

14. The method as recited in claim 13, wherein the oil resistant rubber material is chosen from the group consisting of nitrile butadiene rubber, hydrogenated nitrile butadiene rubber, and a fluoroelastomer.

15. The method as recited in claim 9, further comprising constructing the expandable bladder from a hydrogenated nitrile butadiene rubber comprising a percentage of acrylonytrile in the range of approximately 21 to approximately 49 percent.

16. The method as recited in claim 9, wherein forming the expandable bladder in a semi-expanded configuration comprises curing the expandable bladder.

* * * * *